(12) United States Patent
Su et al.

(10) Patent No.: US 8,371,866 B1
(45) Date of Patent: Feb. 12, 2013

(54) CARD CONNECTOR

(75) Inventors: Yu-hung Su, New Taipei (TW); Ya-yun Cheng, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/229,633

(22) Filed: Sep. 9, 2011

(51) Int. Cl.
*H01R 13/62* (2006.01)
(52) U.S. Cl. .......................................... 439/159
(58) Field of Classification Search ........... 439/159–160
See application file for complete search history.

(56) References Cited

U.S. PATENT DOCUMENTS

| | | | | |
|---|---|---|---|---|
| 5,470,241 A | * | 11/1995 | Kaufman et al. | 439/159 |
| 5,730,610 A | * | 3/1998 | Hsia et al. | 439/160 |
| 5,997,325 A | * | 12/1999 | Hara | 439/159 |
| 6,053,748 A | * | 4/2000 | Bricaud et al. | 439/76.1 |
| 7,112,075 B1 | * | 9/2006 | Su | 439/159 |
| 7,427,206 B2 | * | 9/2008 | Takei et al. | 439/159 |

* cited by examiner

*Primary Examiner* — Briggitte R Hammond
(74) *Attorney, Agent, or Firm* — Cheng-Ju Chiang

(57) ABSTRACT

The present invention discloses a card connector which comprises an insulating body, a plurality of conductive terminals, an ejection mechanism, a tray, and a metal shell. The insulating body has a substrate. One side of the substrate is perforated to form a guide groove of which a bottom surface is a cylindrical surface. The ejection mechanism comprises a pushing shaft, a plurality of balls, a sliding bulk, and a pressing element. The pushing shaft, the plural balls, and the sliding bulk are slidably disposed in the guide groove. The plural balls are located between the pushing shaft and the sliding bulk and can be rolled sequentially. By the design of the ejection mechanism constructed by the pushing shaft, the plural balls, the sliding bulk, and the pressing element, the present invention has an advantage of making the card connector to be of a small size.

11 Claims, 4 Drawing Sheets

CARD CONNECTOR

TECHNICAL FIELD OF THE INVENTION

The present invention relates to a connector, and more particularly, to a card connector able to be implemented as a small size.

BACKGROUND OF THE INVENTION

Electronic cards have been widely used in electronic products such as digital cameras, notebooks, and etc., for expanding memory storage and solving the existed problem of memory shortage. As living quality is improved, the demands for minimizing the size of the electronic products are higher and higher. Therefore, electronic product designers have to provide creative designs and improve the products again and again. They should put efforts to make the electronic products to be of a small size. A conventional card connector usually comprises an insulating body, a plurality of conductive terminals, a metal shell, and an ejection mechanism. The ejection mechanism is generally constructed by an elastic element, a sliding bulk, and a guide rod for achieving card insertion and card ejection.

However, the ejection mechanism of the conventional card connector occupies a large space in the width direction, and it is a disadvantage to make the card connector to be of a small size.

SUMMARY OF THE INVENTION

The objective of the present invention is to provide a new ejection mechanism to make the card connector to be of a small size.

To achieve the above objective, the present invention provides a card connector which comprises an insulating body, a plurality of conductive terminals, an ejection mechanism, a tray, and a metal shell. The insulating body has a substrate. A left side, a right side, and a left part of a rear side of the substrate are extended upward to respectively form a left stand, a right stand, and a rear stand. The substrate, the left stand, the right stand, and the rear stand forms an accommodating trough. Top surfaces of the left stand and the rear stand are perforated to form a guide groove of which a bottom surface is a cylindrical surface. One end of the guide groove is communicated with an outer space while the other end is communicated with the accommodating trough. The plurality of conductive terminals are fastened to the insulating body. The ejection mechanism comprises a pushing shaft, a plurality of balls, a sliding bulk, and a pressing element. The pushing shaft, the plurality of balls, and the sliding bulk are slidably disposed in the guide groove. The plurality of balls are located between the pushing shaft and the sliding bulk and can be rolled sequentially. The tray is received in the accommodating trough. The metal shell covers the insulating body. The pressing element can push the pushing shaft to make the pushing shaft sliding backward and thereby pressing the sliding bulk to move the tray forward, such that the tray is ejected from the accommodating trough of the insulating body.

As described above, the present invention can decrease the width of the card connector significantly by the design of the ejection mechanism constructed by the pushing shaft, the plural balls, the sliding bulk, and the pressing element, and thereby having an advantage of making the card connector to be of a small size.

DETAILED DESCRIPTION OF THE INVENTION

In order to illustrate the techniques, structural features, achieved objectives and effects of the present invention in details, embodiments are provided in conjunction with drawings and are described as follows.

Figure 1:
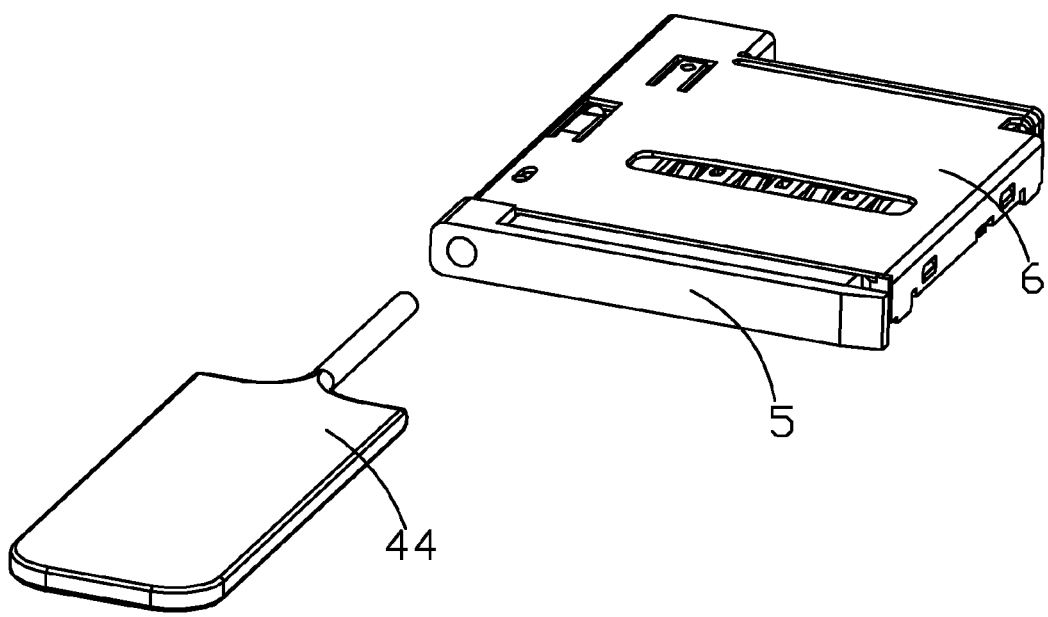
FIG. 1 is a perspective view of a card connector of the present invention.
Figure 2:
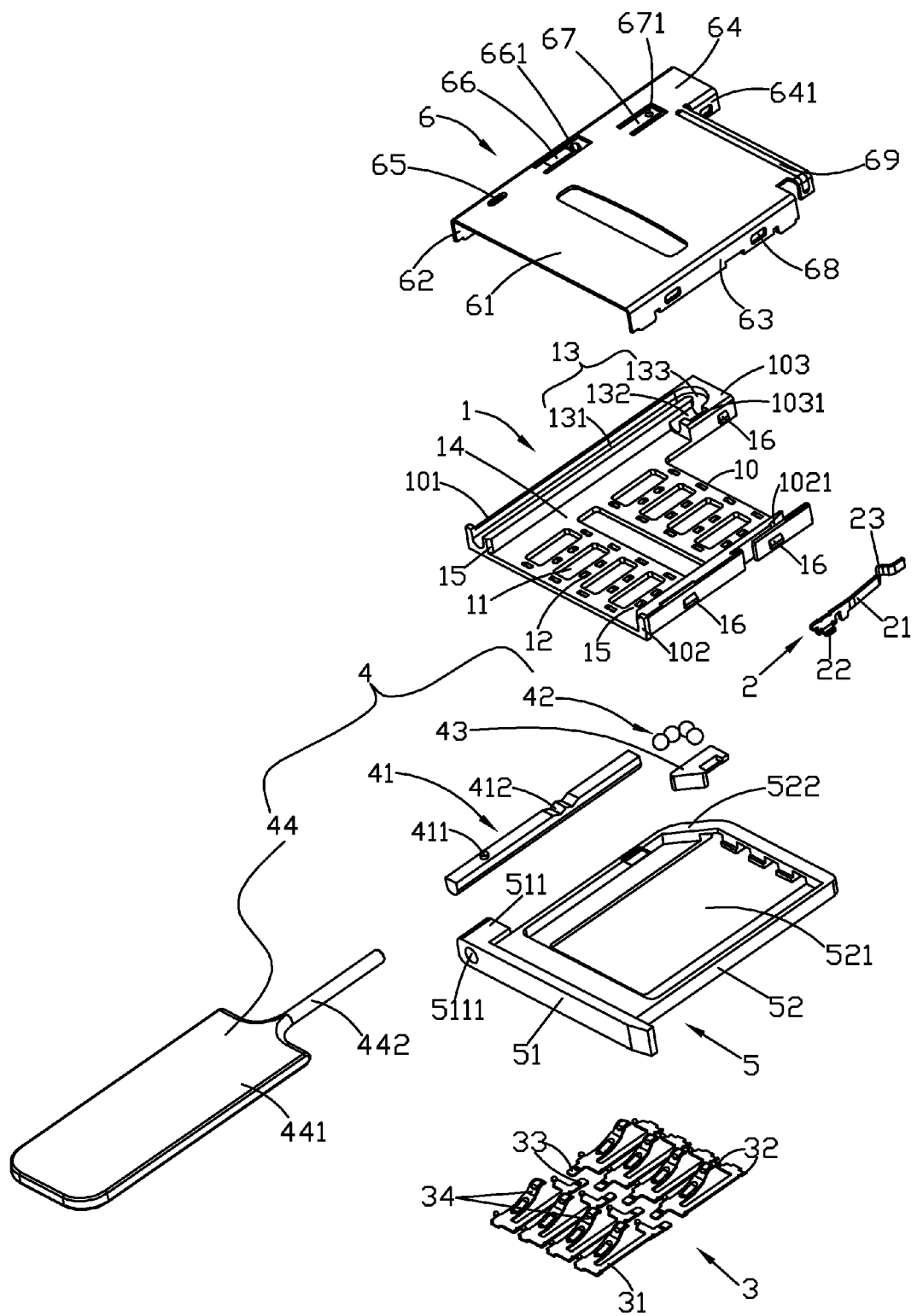
FIG. 2 is an exploded view of the card connector shown in FIG. 1.

Referring to FIG. 1 and FIG. 2, the card connector of the present invention comprises an insulating body 1, a detecting terminal 2, a plurality of conductive terminals 3, an ejection mechanism 4, a tray 5, and a metal shell 6.

Referring to FIG. 2, the insulating body 1 has a substrate 10. The substrate 10 is perforated to form a plurality of terminal slots 11 and is impressed to form a plurality of pin holes 12 around each terminal slot 11. The left side, right side, and left part of the rear side of the substrate 10 are extended upward to form a left stand 101, a right stand 102, and a rear stand 103, respectively. The substrate 10, the left stand 101, the right stand 102, and the rear stand 103 form an accommodating trough 14. The top surfaces of the left stand 101 and the rear stand 103 are perforated to form a guide groove 13 of which the bottom surface is a cylindrical surface. One end of the guide groove 13 is communicated with an outer space while the other end is communicated with the accommodating trough 14. Specifically, the guide groove 13 comprises a pushing groove 131, a sliding groove 132, and a connecting groove 133. The pushing groove 131 has a front end penetrating the front surface of the left stand 101. The sliding groove 132 has a front end penetrating the front surface of the rear stand 103. The connecting groove 133 is bended and extended to connect the pushing groove 131 and the sliding groove 132. Further, the rear stand 103 is perforated to form a long groove 1031 extended forward and backward, and the left side of the long groove 1031 is communicated with the sliding groove 132. The opposite inner walls of the left stand 101 and the right stand 102 both have a guide incline 15 that is inclined from the front end toward the rear end and the inner space. The outer sidewalls of the left stand 101 and the right stand 102, and the right sidewall of the rear stand 103 all have a bulk 16 protruded therefrom. The rear portion of the right stand 102 has a receiving slot 1021 arranged thereon.

Figure 5:
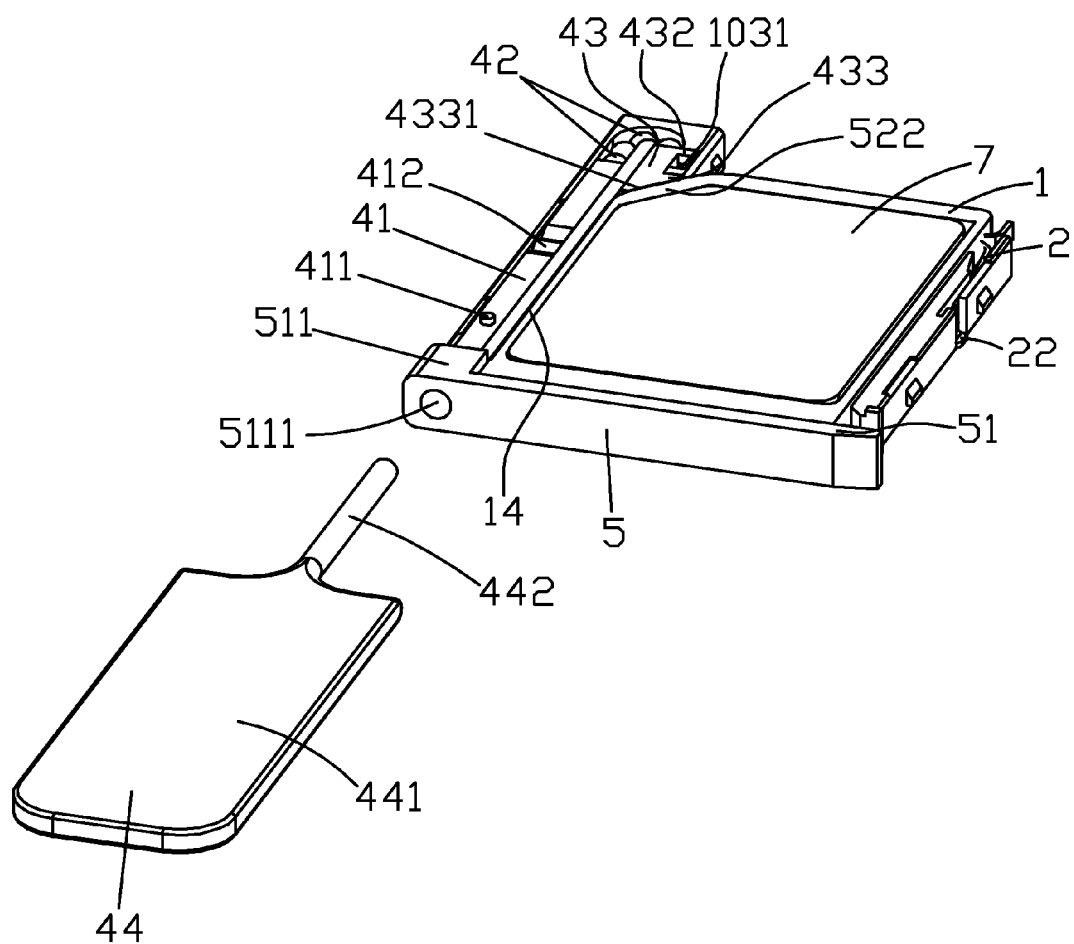
FIG. 5 is a schematic diagram illustrating a part of assembly of the card connector shown in FIG. 1.

Referring to FIG. 2 and FIG. 5, the detecting terminal 2 comprises a sheet-shaped base arm 21, a fixing pin 22, and a contact arm 23. The fixing pin 22 is bended and formed by extending from the bottom wall of the front end of the base arm 21 to the right side. The contact arm 23 is sinuous and formed by extending from the other end of the base arm 21 to the rear portion. The base arm 21 is held steadily in the receiving slot 1021 of the insulating body 1. The contact arm 23 is extended to the accommodating trough 14.

Referring to FIG. 2 and FIG. 5, the plural conductive terminals 3 are fastened to the insulating body 1. Each conductive terminal 3 comprises a base section 31, an inserting portion 32, a welding portion 33, and a contact portion 34. The inserting portion 32 is formed by extending the corners of the left and right ends of the base section 31 outward and upward. The welding portion 33 is formed by horizontally extending the left part of the front end of the base section 31 forward and then bending downward. The contact portion 34 is formed by punching the left part of the base section 31 to possess a structure extending upward and backward. Also, the end of the contact portion 34 has a sinuous shape with an opening facing downward.

Figure 3:
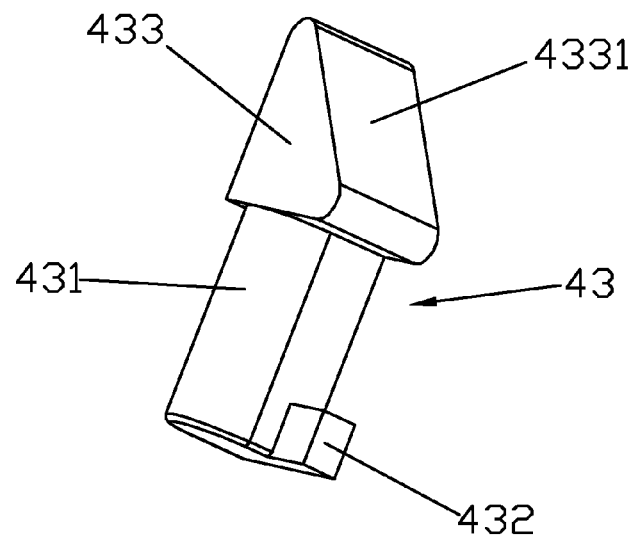
FIG. 3 is a perspective view of a sliding bulk of the card connector shown in FIG. 1.

Referring to FIG. 2, FIG. 3, and FIG. 5, the ejection mechanism 4 comprises a pushing shaft 41, a plurality of balls 42, a sliding bulk 43, and a pressing element 44. The pushing shaft 41 is slidably disposed in the pushing groove 131 of the guide groove 13 of the insulating body 1. The bottom surface of the pushing shaft 41 is a cylindrical surface corresponding to the bottom surface of the guide groove 13. The top surface of the front end of the pushing shaft 41 has a cylindrical protrusion 411 protruded therefrom. The top surface of the pushing shaft 41 also has a wave-shaped notch 412 approximately disposed at a middle portion thereof. The plural balls 42 that are disposed in the connecting groove 133 of the guide groove 13 and located between the pushing shaft 41 and the sliding bulk 43 can be rolled sequentially. The sliding bulk 43 is slidably disposed in the sliding groove 132 of the guide groove 13. The sliding bulk 43 comprises a bulk body 431, a sliding portion 432, and a pressing portion 433. The sliding portion 432 is extended out from the rear portion of the bulk body 431 to the right side. The pressing portion 433 is extended from the front end of the bulk body 431 to the right side. The right side of the pressing portion 433 forms a chamfer 4331 that is inclined along a back direction and a right direction. The pressing element 44 comprises a rectangular plate-like main body 441 and a cylindrical pressing rod 442 protruding from a middle portion of the front end of the main body 441 to the rear side.

Referring to FIG. 1, FIG. 2, and FIG. 5, the tray 5 is received in the accommodating trough 14. The tray 5 comprises a grabbing portion 51 and a plate-like supporting portion 52 protruding from the back sidewall of the grabbing portion 51 to the rear side. The left part of the grabbing portion 51 is protruded backward to form a bulk-like connecting portion 511. The inner part of the connecting portion 511 forms a connecting hole 5111 that penetrates the front surface and the rear surface of the connecting portion 511. The connecting hole 5111 and the guide groove 13 are communicated when the card connector is assembled. The supporting portion 52 is perforated to form a docking receiver 521. The connection part between the left sidewall and the rear sidewall of the supporting portion 52 forms a connecting wall 522 that is inclined along a back direction and a right direction.

Figure 4:
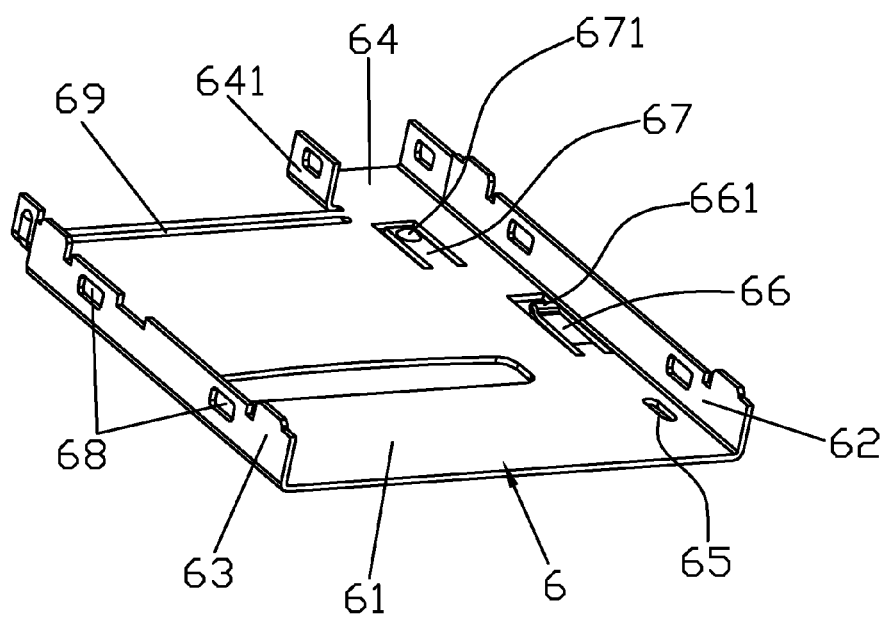
FIG. 4 is a perspective view of a metal shell of the card connector shown in FIG. 1.

Referring to FIG. 1, FIG. 2, and FIG. 4, the metal shell 6 covers the insulating body 1 and forms the accommodating trough 14 together with the substrate 10, the left stand 101, the right stand 102, and the rear stand 103 of the insulating body 1. The metal shell 6 comprises a rectangular plate-like base board 61, a left board 62, a right board 63, and a rear board 64. The left board 62 and the right board 63 are formed by bending and extending downward respectively from the left side and right side of the base board 61. The rear board 64 is formed by horizontally extending backward from the left side of the rear end of the base board 61. The left part of the front end of the base board 61 is perforated to form an elongated through hole 65 that is extended forward and backward opposite to the pushing groove 131. On the base board 61, the portion located in the rear of the through hole 65 and corresponding to the pushing groove 131 is punched to form an elastic bar 66 extended downward and backward. The end of the elastic bar 66 is bended and extended to form a bending portion 661. The base board 61 is punched downward to form an elastic piece 67 corresponding to the sliding groove 132. The rear end of the elastic piece 67 is punched downward to form a spherical protruded point 671 approximately located at a middle portion thereof. The right part of the rear board 64 is bended and extended to form a retarding board 641. The left board 62, the right board 63, and the retarding board 641 are perforated to form a plurality of slots 68 opposite to the bulks 16. The rear part of the base board 61 is punched upward to form a reinforced rib 69.

Please refer to FIGS. 1 to 5. When assembling the card connector of the present invention, the detecting terminal 2 is held steadily in the receiving slot 1021 and the fixing pin 22 is extended out from the insulating body 1. The plurality of conductive terminals 3 are integrally formed on the insulating body 1 and the inserting portions 32 are respectively stuck in the pin holes 12. The contact portions 34 are extended upward from the terminal slots 11 to be located in the accommodating trough 14. Then, the pushing shaft 41, the plurality of balls 42, and the sliding bulk 43 are slidably disposed in the guide groove 13. Specifically, the pushing shaft 41 is slidably disposed in the pushing groove 131. The balls 42 can be rolled and is slidably disposed in the connecting groove 133. The sliding bulk 43 is slidably disposed in the sliding groove 132. The bulk body 431 is slidably disposed in the sliding groove 132. The sliding portion 432 is slidably disposed in the long groove 1031, and the moving distance of the sliding portion 432 is limited by the long groove 1031. The pressing portion 433 is extended to be located in the accommodating trough 14. Next, the tray 5 is assembled to the insulating body 1 and the supporting portion 52 can be slid back and forth in the accommodating trough 14. The arrangement of the guide incline 15 can make the tray 5 smoothly inserting into the accommodating trough 14. Finally, the metal shell 6 covers the insulating body 1. Specifically, the plurality of bulks 16 are respectively inserted into the slots 68. The protrusion 411 is disposed in the through hole 65 and is slidable for a certain distance. The bending portion 661 of the elastic bar 66 presses against the notch 412 for locating the position of the pushing shaft 41. The protruded point 671 of the elastic piece 67 presses against the sliding bulk 43 to prevent from shake when the sliding bulk 43 slides along the sliding groove 132.

When a user wants to insert an electronic card 7 and uses it, the tray 5 is ejected from the insulating body 1 and then the electronic card 7 is placed into the docking receiver 521 of the supporting portion 52. Next, the tray 5 is pushed into the accommodating trough 14. The contact portions 34 of the conductive terminals 3 are connected to the electronic card 7 through the docking receiver 521, and thereby achieving an electrical connection.

When a user wants to withdraw the electronic card 7, the pressing rod 442 of the pressing element 44 can push the pushing shaft 41 via the connecting hole 5111 and make the pushing shaft 41 sliding backward. The balls 42 slide in the connecting groove 133 by the operation of the pushing shaft 41, and thereby pushing the sliding bulk 43 and making the sliding bulk 43 sliding forward in the sliding groove 132. Accordingly, the sliding portion 432 moves forward to press against the front sidewall of the long groove 1031. The chamfer 4331 of the pressing portion 433 touches the connecting wall 522 of the tray 5 and pushes the tray 5 to move forward for a certain distance. Finally, grasp the grabbing portion 51 to withdraw the tray 5 from the accommodating trough 14 of the insulating body 1 and then take out the electronic card 7.

Above all, the present invention can decrease the width of the card connector significantly by the design of the ejection mechanism 4 constructed by the pushing shaft 41, the plural balls 42, the sliding bulk 43, and the pressing element 44, and thereby having an advantage of making the card connector to be of a small size.

What is claimed is:

1. A card connector, for connecting an electronic card, said card connector comprising:

an insulating body having a substrate, in which a top surface of the substrate is perforated to form a guide groove of which a bottom surface is a cylindrical surface, and one end of the guide groove is communicated with an outer space while the other end is communicated with an accommodating trough;

a plurality of conductive terminals fastened to the insulating body;

an ejection mechanism comprising a pushing shaft, a plurality of balls, a sliding bulk, and a pressing element, in which the pushing shaft, the plurality of balls, and the sliding bulk are slidably disposed in the guide groove, the plurality of balls are located between the pushing shaft and the sliding bulk and can be rolled sequentially;

a tray received in the accommodating trough, one end of the tray corresponding to the sliding bulk; and a metal shell covering the insulating body;

wherein the pressing element can push the pushing shaft to make the pushing shaft sliding and thereby pressing the sliding bulk to move the tray, such that the tray is ejected from the accommodating trough of the insulating body.

2. The card connector according to claim 1, wherein a left side, a right side, and a left part of a rear side of the substrate are extended upward to respectively form a left stand, a right stand, and a rear stand, the accommodating trough is formed by the substrate, the left stand, the right stand, and the rear stand, top surfaces of the left stand and the rear stand are perforated to form the guide groove.

3. The card connector according to claim 2, wherein the guide groove comprises a pushing groove having a front end penetrating a front surface of the left stand, a sliding groove having a front end penetrating a front surface of the rear stand, and a connecting groove bended and extended to connect the pushing groove and the sliding groove, the rear stand is further perforated to form a long groove extended forward and backward, a left side of the long groove is communicated with the sliding groove; the pushing shaft is slidably disposed in the pushing groove of the guide groove of the insulating body, the plurality of balls are disposed in the connecting groove of the guide groove and can be rolled sequentially, the sliding bulk is slidably disposed in the sliding groove of the guide groove, the sliding bulk comprises a bulk body, a sliding portion extended out from a rear portion of the bulk body to a right side, and a pressing portion extended from a front end of the bulk body to the right side, a right part of the pressing portion forms a chamfer that is inclined along a back direction and a right direction, the sliding portion is slidably disposed in the long groove, a moving distance of the sliding portion is limited by the long groove, the pressing portion is extended to be located in the accommodating trough.

4. The card connector according to claim 3, wherein the pressing element comprises a rectangular plate-like main body and a cylindrical pressing rod protruding from a middle portion of a front end of the main body to a rear side; the tray is received in the accommodating trough, the tray comprises a grabbing portion and a plate-like supporting portion protruding from a back sidewall of the grabbing portion to a rear side, a left part of the grabbing portion is protruded backward to form a bulk-like connecting portion, an inner part of the connecting portion forms a connecting hole that penetrates a front surface and a rear surface of the connecting portion, the pressing rod of the pressing element can push the pushing shaft via the connecting hole and make the pushing shaft sliding.

5. The card connector according to claim 4, wherein a connection part between a left sidewall and a rear sidewall of the supporting portion forms a connecting wall that is inclined along a back direction and a right direction; the chamfer of the pressing portion touches the connecting wall of the tray.

6. The card connector according to claim 4, wherein the supporting portion is perforated to form a docking receiver, and the electronic card is placed into the docking receiver.

7. The card connector according to claim 3, wherein a bottom surface of the pushing shaft is a cylindrical surface corresponding to a bottom surface of the guide groove, a top surface of a front end of the pushing shaft has a cylindrical protrusion protruded therefrom, the top surface of the pushing shaft also has a wave-shaped notch approximately disposed at a middle portion thereof; the metal shell covers the insulating body and forms the accommodating trough together with the substrate, the left stand, the right stand, and the rear stand of the insulating body, the metal shell comprises a base board, a left board, a right board, and a rear board, the left board and the right board are formed by bending and extending downward respectively from a left side and a right side of the base board, the rear board is formed by horizontally extending backward from the left side of a rear end of the base board, a left part of a front end of the base board is perforated to form an elongated through hole that is extended forward and backward opposite to the pushing groove, on the base board a portion located in the rear of the through hole and corresponding to the pushing groove is punched to form an elastic bar extended downward and backward, an end of the elastic bar is bended and extended to form a bending portion, the base board is punched downward to form an elastic piece corresponding to the sliding groove, a rear end of the elastic piece is punched downward to form a spherical protruded point approximately located at a middle portion thereof; the protrusion is disposed in the through hole and is slidable for a certain distance, the bending portion of the elastic bar presses against the notch for locating a position of the pushing shaft, the protruded point of the elastic piece presses against the sliding bulk.

8. The card connector according to claim 7, wherein outer sidewalls of the left stand and the right stand, and the right sidewall of the rear stand all have at least a bulk protruded therefrom; a right part of the rear board is bended and extended to form a retarding board, the left board, the right board, and the retarding board are perforated to form a plurality of slots opposite to the bulks, the bulks are respectively inserted into the slots.

9. The card connector according to claim 1, further comprising a detecting terminal which comprises a base arm, a fixing pin extending from a front end of the base arm, and a contact arm formed by extending from the other end of the base arm; a rear portion of the right stand has a receiving slot arranged thereon, the base arm is held steadily in the receiving slot, the contact arm is extended to the accommodating trough.

10. The card connector according to claim 1, wherein opposite inner walls of the left stand and the right stand both have a guide incline that is inclined from a front side toward a rear side and inner space.

11. The card connector according to claim 1, wherein the substrate is perforated to form a plurality of terminal slots and is impressed to form a plurality of pin holes around each terminal slot; the plurality of conductive terminals are integrally formed on the insulating body, each conductive terminal comprises a base section, an inserting portion formed by extending corners of a left end and a right end of the base section outward and upward, a welding portion formed by extending the base section, and a contact portion formed by punching a left part of the base section to possess a structure extending upward and backward, an end of the contact portion has a sinuous shape with an opening facing downward, the inserting portions are respectively stuck in the pin holes, the contact portions are extended upward from the terminal slots to be located in the accommodating trough.

* * * * *